United States Patent
Tatum et al.

(10) Patent No.: US 11,866,174 B2
(45) Date of Patent: Jan. 9, 2024

(54) OCCUPANT TRACKING LIGHTING SYSTEM

(71) Applicant: Gulfstream Aerospace Corporation, Savannah, GA (US)

(72) Inventors: Josh Tatum, Savannah, GA (US); Stephen Spencer, Savannah, GA (US); Matthew Wallace, Savannah, GA (US); Kristin Medin, Savannah, GA (US)

(73) Assignee: Gulfstream Aerospace Corporation

( * ) Notice: Subject to any disclaimer, the term of this patent is extended or adjusted under 35 U.S.C. 154(b) by 0 days.

(21) Appl. No.: 17/249,013

(22) Filed: Feb. 17, 2021

(65) Prior Publication Data

US 2022/0258864 A1    Aug. 18, 2022

(51) Int. Cl.
*H05B 47/13*    (2020.01)
*B64D 11/00*    (2006.01)

(52) U.S. Cl.
CPC .............. *B64D 11/00* (2013.01); *H05B 47/13* (2020.01); *B64D 2011/0038* (2013.01)

(58) Field of Classification Search
None
See application file for complete search history.

(56) References Cited

U.S. PATENT DOCUMENTS

| 2012/0038281 A1* | 2/2012 | Verfuerth | H05B 45/10 315/152 |
| 2016/0150614 A1* | 5/2016 | Randolph | H05B 45/10 315/153 |

FOREIGN PATENT DOCUMENTS

| CN | 113002780 A * | 6/2021 | ............. B60Q 3/43 |
| EP | 3738878 A1 | 11/2020 | |
| WO | 2012061709 A1 | 5/2012 | |
| WO | 2016191560 A1 | 12/2016 | |
| WO | WO-2020235897 A1 * | 11/2020 | |

* cited by examiner

*Primary Examiner* — Dedei K Hammond
(74) *Attorney, Agent, or Firm* — LKGlobal | Lorenz & Kopf, LLP

(57) ABSTRACT

A method and apparatus for providing an occupant tracking lighting system including a first light, a second light and a third light within an aircraft cabin including detecting, by a sensor, a location and a velocity of a moving occupant, generating, by a processor, a control signal to illuminate the first light and the second light in response to determining that the location is proximate to the first location and that the velocity being towards the second location, and illuminating, by a controller, the first light and the second light in response to the control signal.

20 Claims, 4 Drawing Sheets

OCCUPANT TRACKING LIGHTING SYSTEM

TECHNICAL FIELD

The present disclosure relates generally to an aircraft cabin lighting system. More specifically, aspects of this disclosure relate to systems, methods and devices for providing an aircraft cabin lighting system configured to detect an occupant presence and to illuminate areas proximate to the occupant.

BACKGROUND

Aircraft cabin lighting is provided within aircraft passenger and crew compartments for the convenience of aircraft occupants. This aircraft lighting may be adjusted according to the time and situation of the aircraft. For example, during overnight flights, the aircraft cabin light may be dimmed to make it easier for aircraft passengers to sleep. During passenger boarding and deplaning, aircraft cabin lighting may be set to a maximum light intensity to improve visibility during these operations. Aircraft cabin lighting may include overhead lighting, indirect accent lighting, individual reading lights, task lighting, and floor path lighting.

For optimal sleeping, the lights in the cabin are kept at the lowest possible brightness levels, which may be completely off. This presents an issue for the flight attendants to maneuver around the cabin or for other passengers to get to the lavatory. Turning on the lights causes resting passengers to be disturbed. It is desirable to address these problems and to provide aircraft lighting that provides maximum comfort for aircraft occupants while meeting the requirements of crew and other aircraft occupants.

The above information disclosed in this background section is only for enhancement of understanding of the background of the invention and therefore it may contain information that does not form the prior art that is already known in this country to a person of ordinary skill in the art.

SUMMARY

Disclosed herein is an aircraft lighting system, a method and related control logic for provisioning aircraft lighting systems, a method for making and a method for operating such systems, and vehicles equipped with such aircraft lighting systems. By way of example, and not limitation, there is presented an aircraft configured for providing an aircraft cabin lighting system configured to detect an occupant presence and to illuminate areas proximate to the occupant.

In accordance with an aspect of the present disclosure, a lighting system for use in a cabin of an aircraft including a first light located at a first location within the cabin, a second light located at a second location within the cabin, a sensor for detecting a location and a velocity of a moving occupant, a processor communicatively coupled to the sensor for generating a control signal to illuminate the first light and the second light in response to determining that the location is proximate to the first location and that the velocity being towards the second location, and a controller communicatively coupled to the processor and operatively coupled to the first light and the second light, the controller configured for illuminating the first light and the second light in response to the control signal.

In accordance with an aspect of the present disclosure, a method for detecting, by a sensor, a location and a velocity of a moving occupant, generating, by a processor, a control signal to illuminate the first light and the second light in response to determining that the location is proximate to the first location and that the velocity being towards the second location, and illuminating, by a controller, the first light and the second light in response to the control signal.

In accordance with an aspect of the present disclosure, an aircraft cabin lighting system including a first light at a first location along an aircraft cabin aisle, a second light at a second location along the aircraft cabin aisle, a third light at a third location along the aircraft cabin aisle wherein the second location is between the first location and the third location, a sensor for determining an occupant location and an occupant velocity of a moving occupant, a processor for generating a control signal for illuminating the second light and the third light in response to the occupant location being proximate to the second location and the occupant velocity being towards the third light, and a controller for illuminating the third light and the second light in response to the control signal.

The above advantage and other advantages and features of the present disclosure will be apparent from the following detailed description of the preferred embodiments when taken in connection with the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings.

The exemplifications set out herein illustrate preferred embodiments of the invention, and such exemplifications are not to be construed as limiting the scope of the invention in any manner.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
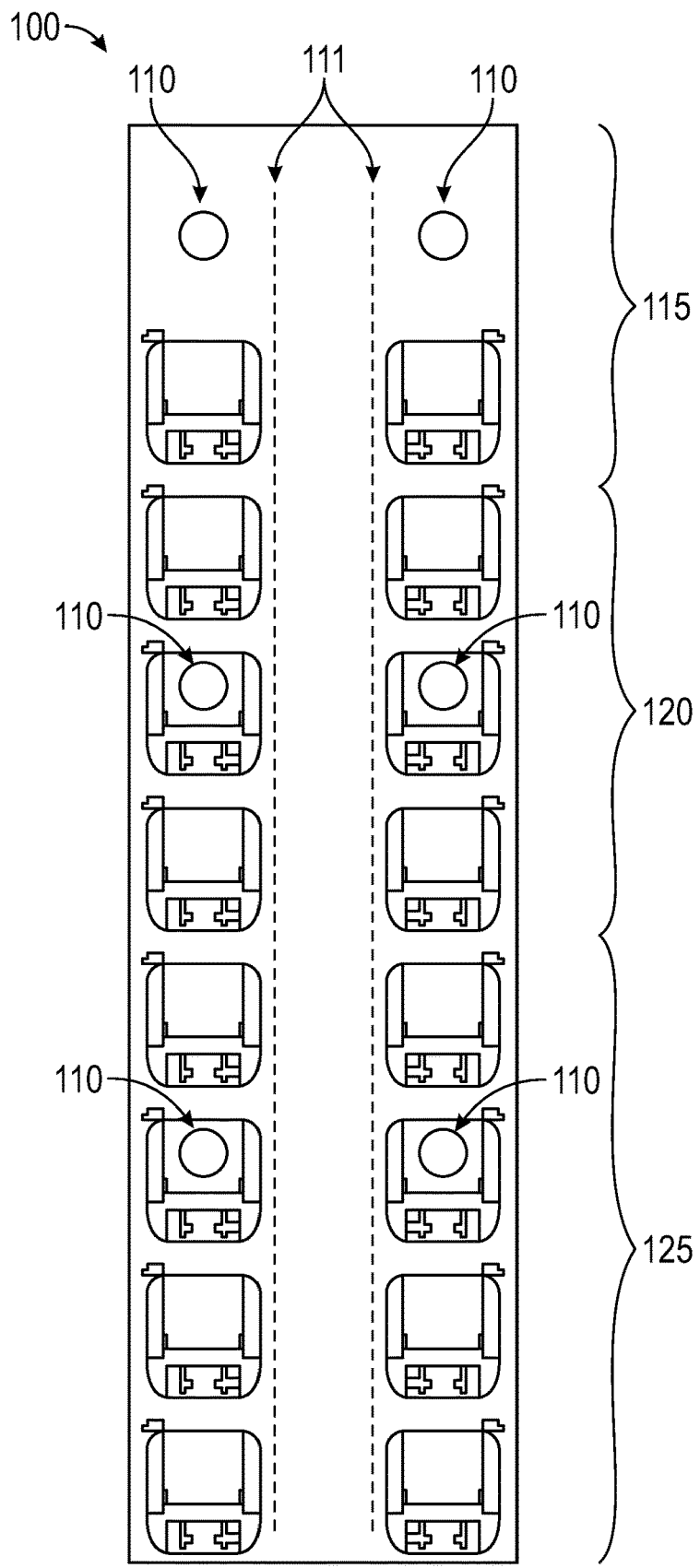
FIG. 1 shows a schematic view illustrating an operating environment for providing an occupant tracking lighting system within an aircraft cabin according to an exemplary embodiment.

FIG. 1 schematically illustrates an exemplary operating environment 100 for providing an occupant tracking lighting system within an aircraft cabin according to an exemplary embodiment of the present disclosure. The exemplary operating environment 100 depicts an aircraft passenger cabin having a plurality of passenger seats in a forward cabin 115, mid cabin 120 and rear cabin 125. The exemplary aircraft cabin is further equipped with various forms of lighting, such as a plurality of overhead lights 110 and floor path lighting 111 and one or more proximity sensors 112.

The exemplary system uses the proximity sensors 112, such as passive infrared sensors, LiDAR, cameras, pressure sensors, etc., to track the position of occupants throughout the aircraft passenger cabin. The system then utilizes that position information and references it against a map of the cabin lighting stored in the memory of the aircraft control system to allow for dynamic illumination of specified lights such as overhead lights 110 and floor path lighting 11 as desired. The dynamic illumination of the specified lights may illuminate areas of the cabin where the occupant is moving rather than the entire cabin. This allows for the sleeping occupants to be minimally impacted as the occupant moves about the cabin area safely. The system is capable of detecting a moving occupants speed and direction within the cabin to predict the movement of the occupant. The system may then illuminate the current location of the moving occupant and the area in front of the moving occupant to enable safe navigation of the aircraft cabin while minimizing the lighting impact on other occupants. While this system is described within an aircraft cabin environment, this recited systems and methods may be employed in any environment having multiple lighting sources.

Figure 2:
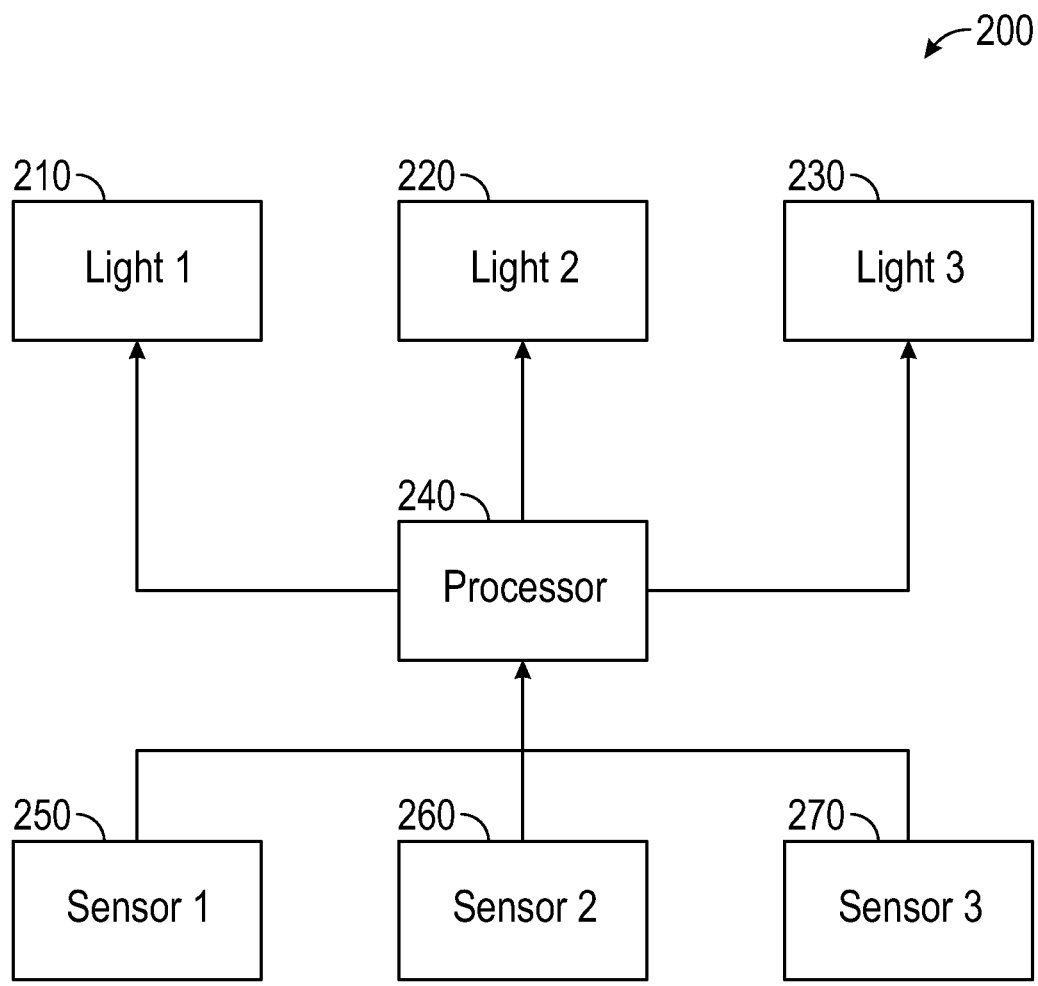
FIG. 2 shows a block diagram illustrating a system for providing an occupant tracking lighting system within an aircraft cabin according to an exemplary embodiment.

Turning now to FIG. 2 is a schematic view illustrating an exemplary system 200 for providing an occupant tracking lighting system within an aircraft cabin according to an exemplary embodiment of the present disclosure is shown. The exemplary system 200 may include a first light 210, a second light 220, a third light 230, a processor 240, a first sensor 250, a second sensor 260 and a third sensor 270.

The first light 210, the second light 220 and the third light 230 may be aircraft cabin lighting sources, such as overhead lights, floor mounted aisle lighting, seat mounted lighting used to illuminate a walkway or an aisle or the like. The lighting may include light emitting diodes (LEDs), florescent elements, or other light emitting components which may be individually dimmable or may be turned on or off in response to a control signal from the processor 240 or in response to an application or a removal of a source of electrical power. In an exemplary embodiment, the first light 210 may be positioned to illuminate a walkway at a forward location, the third light 230 positioned to illuminate the walkway at a rearward location and the second light 220 positioned to illuminate the walkway at a central location between the forward location and the rearward location. In this configuration when the first light 210, second light 220 and third light 230 are illuminated, the walkway may be continuously lit between the forward location and the rearward location.

The exemplary system 200 further includes a first sensor 250, a second sensor 260 and a third sensor 270 located throughout an aircraft cabin. The sensors are configured to detect movement of an occupant within the aircraft cabin and may detect movement, location, and/or velocity of the occupant. The sensors may be infrared sensors for transmitting an infrared light signal and detecting a distance to an occupant in response to the time of propagation and the direction of transmission. The sensors may be passive infrared sensors for detecting a change in temperature in the cabin indicative of a passenger. Location of the passenger may then be determined in response to a triangulation of multiple detections from passive infrared sensors. The velocity of the occupant can be determined in response to tracking the location of an occupant over a plurality of location determinations. The velocity may be determined in response to a change in frequency of a transmitted signal compared to the received signal. The sensors may be LiDAR sensors, sonar sensors, radio frequency or microwave sensors, pressure sensors, cameras or any sensor capable of determining a location of an occupant.

In this exemplary embodiment, the processor 240 may be configured to receive a first occupant location detection at a first time from one or more sensors. The processor 240 may then subsequently receive a second occupant location detection at a second time from one or more sensors. The processor 240 may then determine a current location and a velocity of the occupant in response to the first occupant location detection and the second occupant location detection. In response to a determination of a moving occupant and the occupant location and velocity, the processor 240 may then generate a control signal to illuminate one of the lights proximate to the moving occupant and one of the lights in a location where the occupant is moving. For example, if the occupant is detected moving near the central location between the forward location and the rearward location and the occupant is moving towards the forward location, the processor 240 may generate a control signal to illuminate the second light 220 and the first light. The processor 240 may further control the luminance of one or more lights in response to the velocity of the occupant or in response to the distance from the moving occupant to the light.

In one exemplary embodiment, the processor 240 may generate control information to alter the luminance of a light depending on the velocity and location of the moving occupant. For example, as an occupant approaches a lighting location, the luminance may be increased. The luminance may be increased at a rate proportional to a velocity of the moving occupant. Likewise, as a moving occupant moves past a lighting location, the luminance of the light may be decreased. In another exemplary embodiment, if the velocity of the moving occupant exceeds a certain threshold, such as an occupant running which may be indicative of an emergency situation, the processor 240 may generate a control signal to illuminate all of the lights to a predetermined level, such as a maximum luminance.

Figure 3:
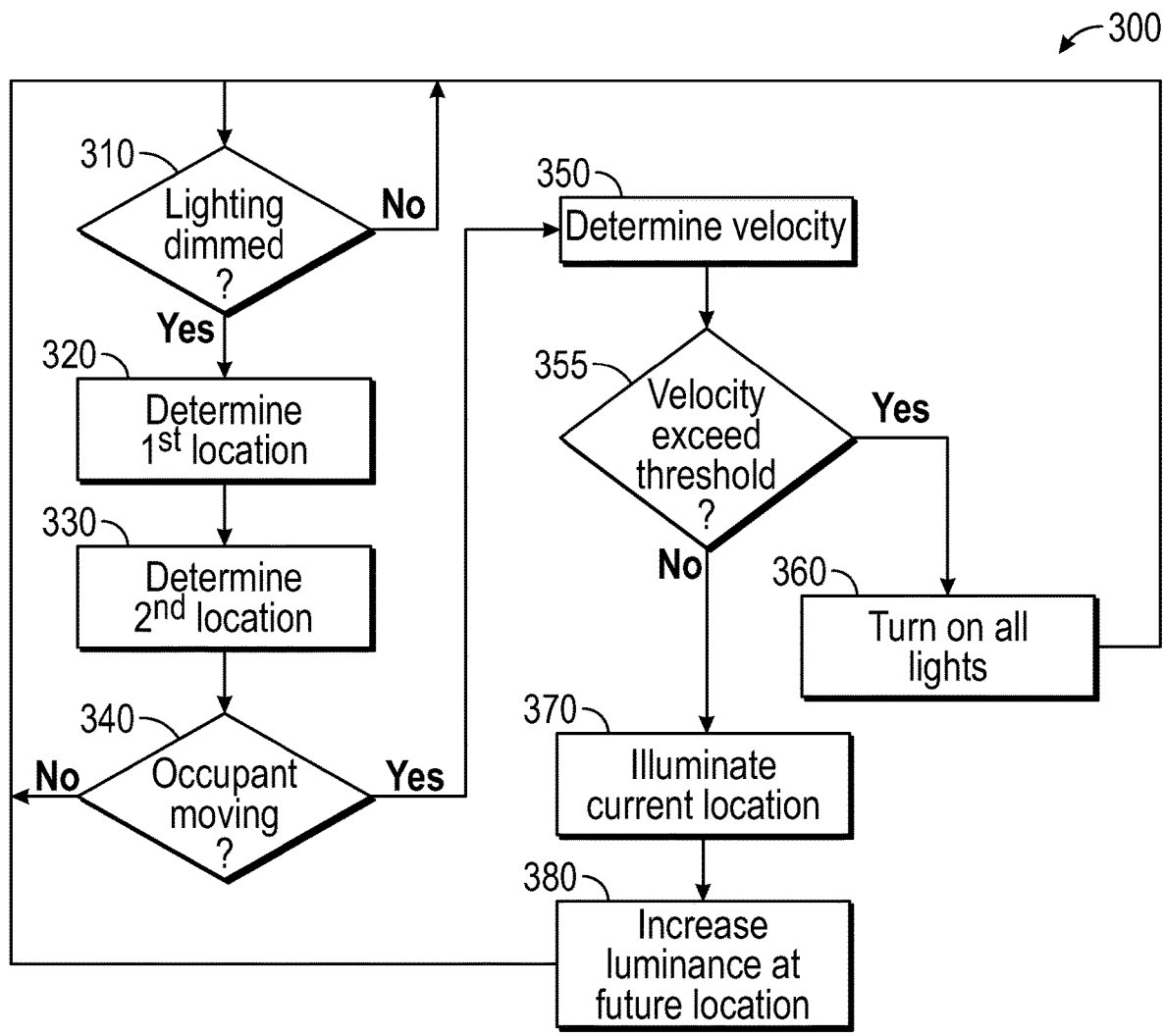
FIG. 3 shows a flow chart illustrating a method for providing an occupant tracking lighting system within an aircraft cabin according to another exemplary embodiment

Turning now to FIG. 3, a block diagram illustrating an exemplary implementation of a method 300 for providing an occupant tracking lighting system within an aircraft cabin according to an exemplary embodiment of the present disclosure is shown. The exemplary method may be configured to illuminate an aircraft cabin and/or walkway in response to a moving occupant in order to allow the occupant to move about the cabin but reduce the impact of the light on other occupants.

The method is first operative to determine 310 if the lighting has been dimmed. For example, the lighting may be dimmed during overnight hours to make the cabin more comfortable for sleeping passengers. If the lighting has not been dimmed, the method returns to periodically determine if the lighting has been dimmed.

If the lighting has been dimmed, the method is next operative to determine 320 a location of a first location of a cabin occupant. The first location of the cabin occupant may be determined in response to a signal from one or more sensors within the aircraft cabin. The sensors may include passive infrared sensors, infrared motion sensors, LiDAR, radar, optical sensors or the like. The first location is then saved in a memory of an aircraft control system.

The method is next operative 330 to determine a second location of a cabin occupant after a predetermined period of time after the first location measurement. The second location may be determined using the same sensors as the first location. The second location may then be stored in a memory. The method then determines 340 if the occupant is moving and a velocity of the occupant movement. The occupant may be determined to be moving if the first location is not the same as the second location and the distance between the two locations exceeds a predetermined distance over a predetermined amount of time. The movement of an occupant may be estimated by tracking the measured locations if there are one or more moving occupants. For example, a moving occupant is most likely to follow a direct path and not randomly change locations within a cabin. Thus, by tracking the location paths, the paths of moving occupants may be estimated.

If the occupant is not moving, indicated by the first location and the second location being substantially identical, the method then returns to determining 310 if the lighting has been dimmed. If the occupant is determined to be moving, the method is next configured to determine 350 the velocity of the occupant. The velocity of the occupant may include the speed and direction of movement of the occupant. Velocity may be determined in response to the distance between the first location and the second location over the time between location detections.

The method then determines 355 if the velocity of the moving occupant exceeds a threshold velocity. The threshold velocity could be indicative of a person running or moving rapidly within the aircraft cabin. If the velocity of the moving occupant exceeds a threshold velocity, all of the lights within the cabin may be illuminated 360. If the occupant velocity does not exceed the velocity threshold, the system may then illuminate 370 a light proximate to the current location of the occupant. In addition, the system may then illuminate 380 one or more lights in a direction of movement of the occupant. For example, if the occupant is moving towards the front of the cabin, the method may illuminate the pathway light proximate to the occupant and one or more pathway lights towards the front of the cabin. In addition, the method may determine that a moving occupant has passed a previously illuminated light and is moving away from the previously illuminated light, the method may then reduce, or turn off, the luminance of the previously illuminated light. In this example, the expected pathway of the moving occupant is illuminated and the prior pathway of the moving occupant is no longer illuminated.

Figure 4:
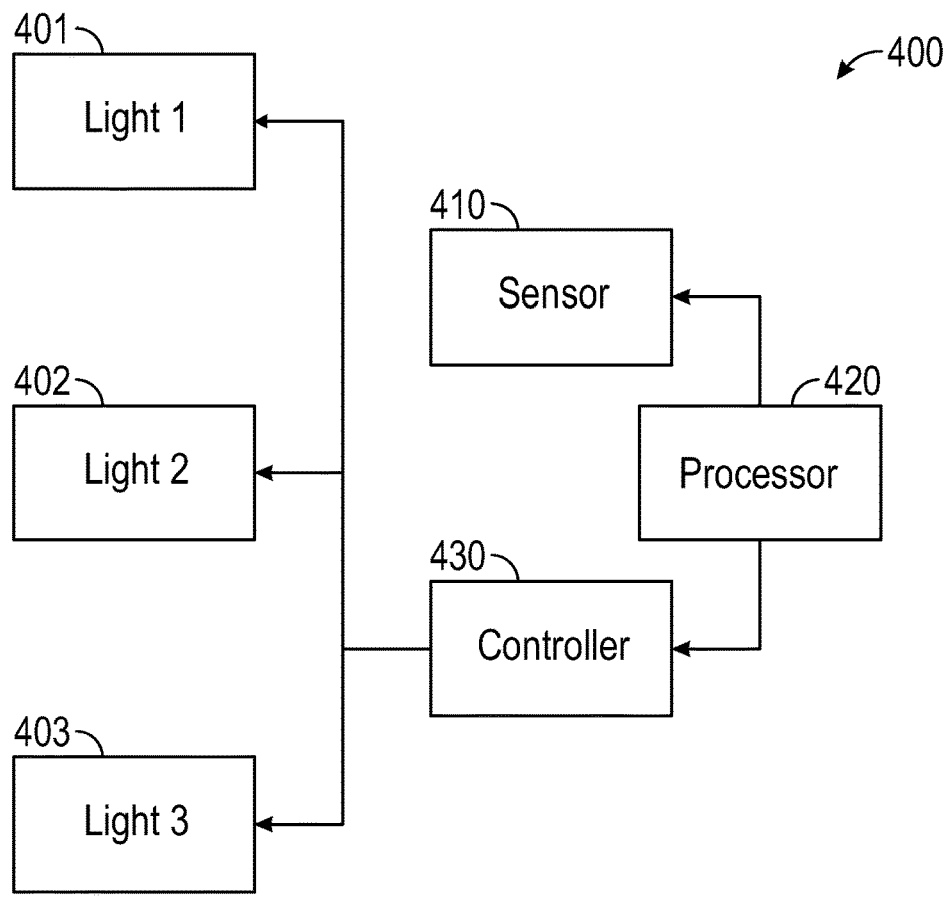
FIG. 4 shows a block diagram illustrating a system for providing an occupant tracking lighting system within an aircraft cabin according to another exemplary embodiment.

Turning now to FIG. 4, a block diagram illustrating another exemplary implementation of a system 400 for providing an occupant tracking lighting system within an aircraft cabin according to an exemplary embodiment of the present disclosure is shown. The system 400 may form part of an aircraft cabin lighting system including a sensor 410, a processor 420, a controller 430, a first light 401, a second light 402, and a third light 403.

The exemplary system 400 may include a plurality of lights arranged around an aircraft cabin in including a first light 401 located at a first location, a second light 402 located at a second location, and third light 403 located at a third location. In an exemplary embodiment, the first light 401, second light 402, and third light 403 may form part of an aisleway illumination system for illuminating a cabin aisleway. In this example, the second light 402 is located at a location between the first light 401 and the third light 403.

The sensor 410 may be configured for detecting a location and a velocity of a moving occupant. The sensor may be an active sensor, such as a LiDAR or sonar, or a passive sensor, such as a passive infrared sensor. The sensor 410 may include a plurality of sensors spaced around the aircraft cabin for determining the position of the moving occupant from with respect to the different locations and for combining these position determinations to approximate the location. The moving occupant velocity may be determined in response to tracking the location of the moving occupant over a period of time.

The processor 420 may be configured for generating a control signal to illuminate the first light and the second light in response to determining that the location is proximate to the first location and that the velocity being towards the second location. The processor 420 may be further configured for generating the control signal to illuminate the first light, the second light, and the third light in response to determining that the velocity exceeds a threshold velocity. In this example, the threshold velocity may be indicative of an occupant running or moving quickly through the cabin which may be indicative of an emergency situation. The processor 420 may be further configured for generating the control signal to dim the first light in response to a subsequent location not being proximate to the first light 401 and the velocity being away from the first light 401. For example, as the moving occupant passes a light, the light is dimmed.

The controller 430 may be configured for illuminating the first light 401 and the second light 402 in response to the control signal from the processor 430. The controller 430 may control the luminance of the lights such that the luminance of the lights is proportional to the velocity of the moving occupant. For example, if the moving occupant is moving towards the second light 402, the second light luminance may be proportional to a magnitude of the velocity. Alternatively, the luminance of the first light 401 and the second light 402 may be proportional to a magnitude of the velocity either at the same luminance or different luminance in response to the occupant location. The controller 430 may be further configured for illuminating all of the cabin lights, such as the first light 401, the second light 402 and the third light 403, in response to the control signal.

In one exemplary embodiment, the system 400 may be an aircraft cabin lighting system including a first light at a first location along an aircraft cabin aisle, a second light at a second location along the aircraft cabin aisle, a third light at a third location along the aircraft cabin aisle wherein the second location is between the first location and the third location. The system may further include a sensor for determining an occupant location and an occupant velocity of a moving occupant, a processor for generating a control signal for illuminating the second light and the third light in response to the occupant location being proximate to the second location and the occupant velocity being towards the third light, and a controller for illuminating the third light and the second light in response to the control signal. In this example, the control signal may indicate illuminating the first light, the second light, and the third light in response to the occupant velocity exceeding a threshold velocity and wherein the controller is further configured for illuminating the first light, the second light and the third light in response to the control signal.

Figure 5:
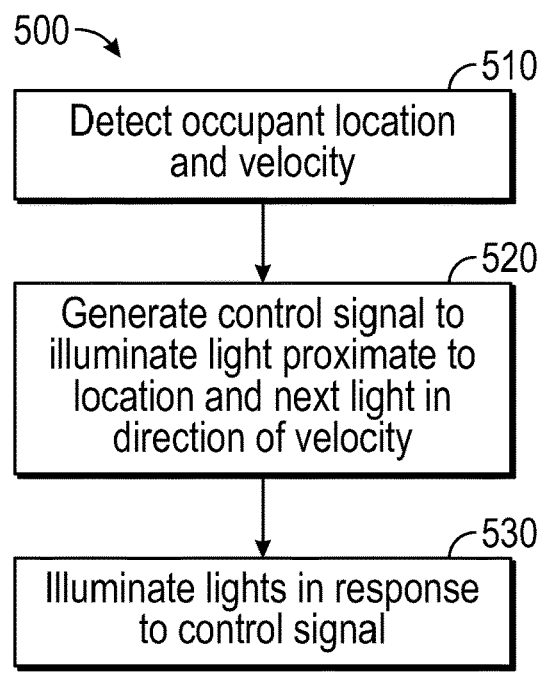
FIG. 5 shows a flow chart illustrating a method for providing an occupant tracking lighting system within an aircraft cabin according to another exemplary embodiment.

Turning now to FIG. 5, a flow chart illustrating an exemplary implementation of a method 500 for providing an occupant tracking lighting system within an aircraft cabin according to an exemplary embodiment of the present disclosure is shown. In this exemplary embodiment, the method 500 may be a method of controlling lighting within an aircraft cabin in response to a movement of an occupant. Initially, the method may be initiated in response to the cabin lighting being dimmed such as to accommodate sleeping passengers.

The method is first configured for detecting 510, by a sensor, a location and a velocity of a moving occupant. The sensor may be an active or passive sensor, such as a passive infrared sensor, or a plurality of sensors. The sensors may determine the location of a moving occupant in response to a direction and propagation time of a transmitted light pulse, electromagnetic signal, sonic signal or the like. The location of the moving occupant may be determined in response to a combination of detections of multiple sensors. The velocity may be determined by tracking a plurality of locations of the moving occupant taken periodically over an interval of time.

The method is next configured for generating 520, by a processor, a control signal to illuminate the first light and the second light in response to determining that the location is proximate to the first location and that the velocity being towards the second location. The lights are illuminated such that the light at the current location of the moving occupant is illuminated and at least one light in front of the moving occupant is illuminated resulting in the aisleway being safely illuminated for the moving occupant without being excessively illuminated thereby causing discomfort for other passengers. In one exemplary embodiment, the control signal may indicate illuminating the first light, the second light, and the third light in response to the velocity exceeding a threshold velocity wherein the threshold velocity may be indicative of an full lighting required event. In this example, the controller is further configured for illuminating the first light, the second light and the third light in response to the control signal.

The method next illuminates, by a controller, the first light and the second light in response to the control signal. In this exemplar, the second light is located between the first light and the third light. In one example, the luminance of the first light and/or the second light may be proportional to a magnitude of the velocity. For example, if the occupant is moving slowly, the lights may have less luminance. If the occupant is moving faster, the luminance may be greater. IN addition, the system may dim a light after the moving occupant has passed a location associated with the light. For example, the controller may dim the first light in response to a subsequent location not being proximate to the first light and the velocity being away from the first light.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A lighting system comprising:
   a first light located at a first location;
   a second light located at a second location;
   a sensor for detecting a location and a velocity of a moving occupant;
   a processor communicatively coupled to the sensor for generating a control signal to illuminate the first light and the second light in response to determining that the location is proximate to the first location and that the velocity being towards the second location wherein a luminance of the second light is proportional to a magnitude of the velocity of the moving occupant; and
   a controller communicatively coupled to the processor and operatively coupled to the first light and the second light, the controller configured for illuminating the first light and the second light in response to the control signal.

2. The lighting system of claim 1, wherein the second light is located between the first light and a third light.

3. The lighting system of claim 1, wherein the first light, the second light and a third light form part of an aircraft aisleway lighting system.

4. The lighting system of claim 1, wherein the processor is further configured for generating the control signal to illuminate the first light, the second light, and a third light in response to determining that the velocity exceeds a threshold velocity and wherein the controller is further configured for illuminating the first light, the second light and the third light in response to the control signal.

5. The lighting system of claim 1, wherein a luminance of the first light is proportional to a magnitude of the velocity.

6. The lighting system of claim 1, wherein the sensor is a passive infrared sensor.

7. The lighting system of claim 1, wherein the velocity is determined in response to tracking the location of the moving occupant over a period of time.

8. The lighting system of claim 1, wherein the processor is further configured for generating the control signal to dim the first light in response to the processor determining that the occupant has moved a predetermined distance away from the first light.

9. The lighting system of claim 1, wherein the velocity of the moving occupant is determined in response to a movement of the moving occupant at the location.

10. A method comprising:
    detecting, by a sensor, a location and a velocity of a moving occupant;
    generating, by a processor, a control signal to illuminate a first light and a second light in response to determining that the location is proximate to a first location and that the velocity being towards a second location; and
    illuminating, by a controller, the first light and the second light in response to the control signal wherein a luminance of the second light is proportional to a magnitude of the velocity of the moving occupant.

11. The method of claim 10, wherein the second light is located between the first light and a third light.

12. The method of claim 10, wherein the first light, the second light and the third light form part of an aircraft aisleway lighting system.

13. The method of claim 10, wherein the control signal indicates illuminating the first light, the second light, and the third light in response to the velocity exceeding a threshold velocity and wherein the controller is further configured for illuminating the first light, the second light and the third light in response to the control signal.

14. The method of claim 10, wherein the luminance of the first light and the second light are proportional to a magnitude of the velocity.

15. The method of claim 10, wherein the sensor is a passive infrared sensor.

16. The method of claim 10, wherein the velocity is determined in response to tracking the location of the moving occupant over a period of time.

17. The method of claim 10, further including dimming the first light in response to determining, by the processor, that the moving occupant has moved a predetermined distance away from the first light.

18. The method of claim 10, wherein the velocity is determined in response to a velocity of a movement of the moving occupant at the location.

19. A lighting system comprising:
a first light at a first location;
a second light at a second location;
a third light at a third location wherein the second location is between the first location and the third location;
a sensor for determining an occupant location and an occupant velocity of a moving occupant;
a processor communicatively coupled to the sensor for generating a control signal for illuminating the second light and the third light in response to the occupant location being proximate to the second location and the occupant velocity being towards the third light; and
a controller communicatively coupled to the processor and operationally coupled to the first light, the second light and the third light for illuminating the third light and the second light in response to the control signal wherein a luminance of the second light is proportional to a magnitude of the occupant velocity of the moving occupant.

20. The lighting system of claim 19, wherein the control signal indicates illuminating the first light, the second light, and the third light in response to the occupant velocity exceeding a threshold velocity and wherein the controller is further configured for illuminating the first light, the second light and the third light in response to the control signal.

* * * * *